US00RE36551E

United States Patent [19]

Chen

[11] E Patent Number: Re. 36,551

[45] Reissued Date of Patent: Feb. 8, 2000

[54] TRANSMISSION MECHANISM FOR MUSIC BOX ORNAMENT

[76] Inventor: Yu-Kai Chen, No. 2-2, Lane 15, Da-Hsing St., Tan-Shui Town, Taiwan

[21] Appl. No.: 09/187,093

[22] Filed: Nov. 5, 1998

Related U.S. Patent Documents

Reissue of:

[64] Patent No.: 5,571,979
Issued: Nov. 5, 1996
Appl. No.: 08/547,366
Filed: Oct. 24, 1995

[51] Int. Cl.[7] ..... G10F 1/06

[52] U.S. Cl. ..... 84/95.2; 446/298

[58] Field of Search ..... 84/95.2, 95.1, 84/94.1, 94.2; 446/298, 238

[56] References Cited

U.S. PATENT DOCUMENTS

| | | | |
|---|---|---|---|
| Re. 33,933 | 5/1992 | Hou | 446/301 |
| 5,412,889 | 5/1995 | Hou | 40/411 |
| 5,448,007 | 9/1995 | Hou | 84/95.2 |

*Primary Examiner*—Robert E. Nappi
*Assistant Examiner*—Shih-Yung Hsieh
*Attorney, Agent, or Firm*—Bacon & Thomas

[57] ABSTRACT

A transmission mechanism for music box ornament, including a rotary wheel rotated by the eproducer of a conventional wind-up music box mechanism and having an eccentric rod, a locating block fixedly mounted within a base plate within which the wind-up music box mechanism is mounted, a follower plate supported on the eccentric rod and vertically 10 reciprocated by it along a downward rod on the locating block, and a tappet rod inserted through a hole on the locating block and driven by the follower plate to reciprocate an ornament.

12 Claims, 8 Drawing Sheets

TRANSMISSION MECHANISM FOR MUSIC BOX ORNAMENT

Matter enclosed in heavy brackets [ ] appears in the original patent but forms no part of this reissue specification; matter printed in italics indicates the additions made by reissue.

BACKGROUND OF THE INVENTION

The present invention relates to a transmission mechanism for music box ornament which uses the reproducer of a wind-up music box mechanism to turn a rotary wheel with an eccentric rod, causing the eccentric rod of the rotary wheel to reciprocate an ornament through a follower plate.

Various music box-incorporated ornamental display assemblies have been disclosed, and have appeared on the market. These ornamental display assemblies are rotated or reciprocated by the the driving mechanism of a wind-up music box mechanism through a transmission mechanism. However, conventional transmission mechanisms for use with wind-up music box mechanism are commonly complicated and expensive.

SUMMARY OF THE INVENTION

It is one object of the present invention to provide a transmission mechanism for music box ornament which is simple in structure and inexpensive to manufacture. It is another object of the present invention to provide a transmission mechanism for music box ornament which moves different ornaments in different ways. According to one aspect of the present invention, the transmission mechanism comprises a rotary wheel rotated by the reproducer of a conventional wind-up music box mechanism and having an eccentric rod, a locating block fixedly mounted within a base plate within which the wind-up music box mechanism is mounted, a follower plate supported on the eccentric rod and vertically reciprocated by it along a downward rod on the locating block, and a tappet rod inserted through a hole on the locating block and driven by the follower plate to reciprocate an ornament. According to another aspect of the present invention, the base plate is supported on a rocker, having a spring supported T-rod stopped below the eccentric rod of the rotary wheel, the T-rod being alternatively moved up and down by the eccentric rod of the rotary wheel and the spring to force the rocker moved forwards and backwards alternatively when the wind-up music box mechanism is operated.

DETAILED DESCRIPTION OF THE PREFERRED EMBODIMENT

Figure 1:
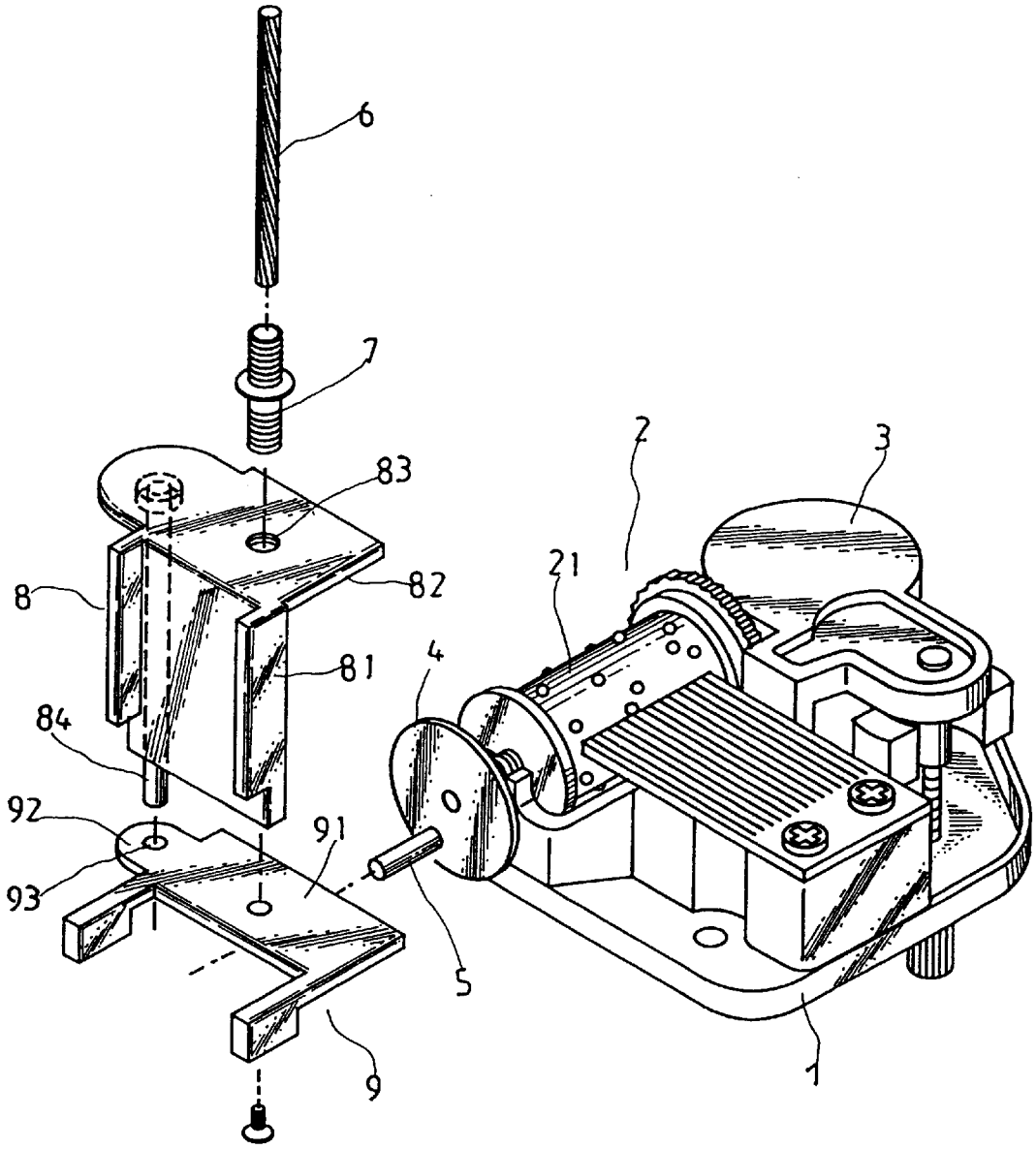
FIG. 1 is an exploded view of a transmission mechanism for music box ornament according to the present invention.
Figure 2A:
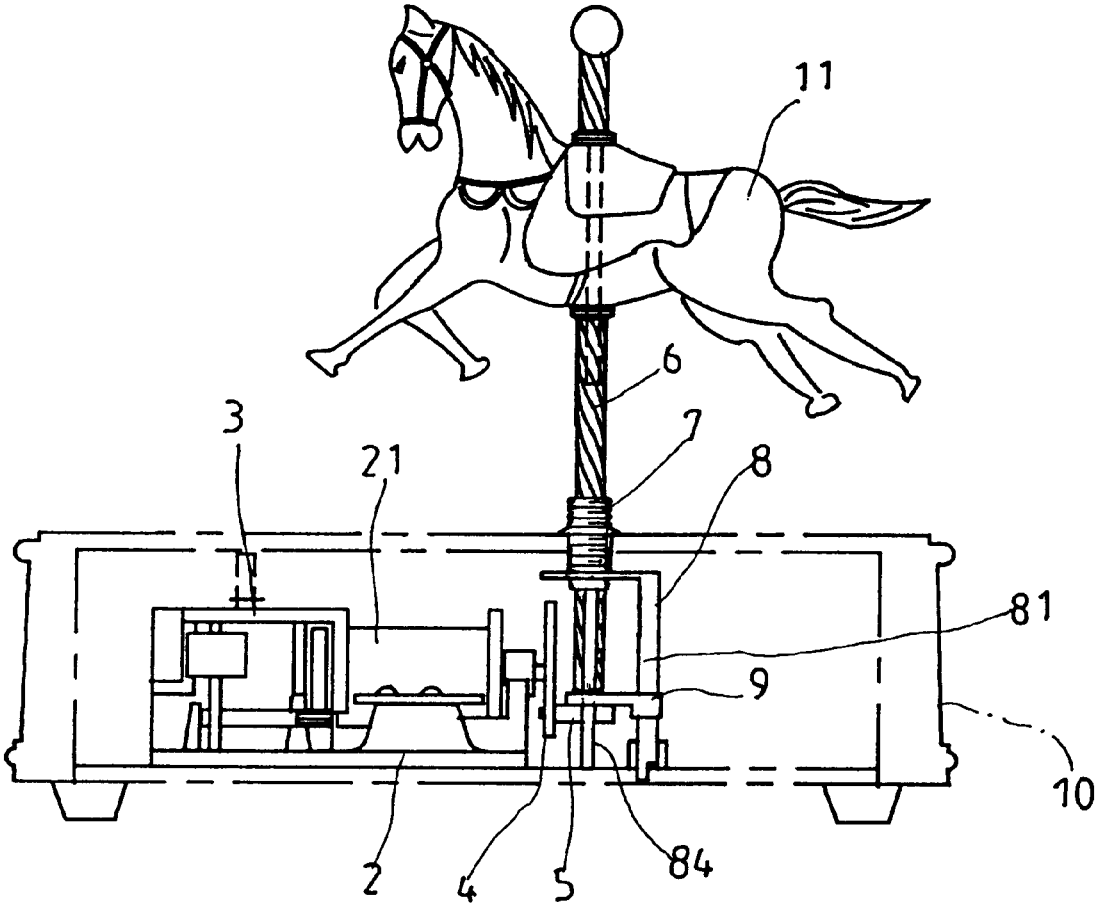
FIG. 2A is a front view in section of the transmission mechanism of FIG. 1, showing the down stroke of the ornament.
Figure 2B:
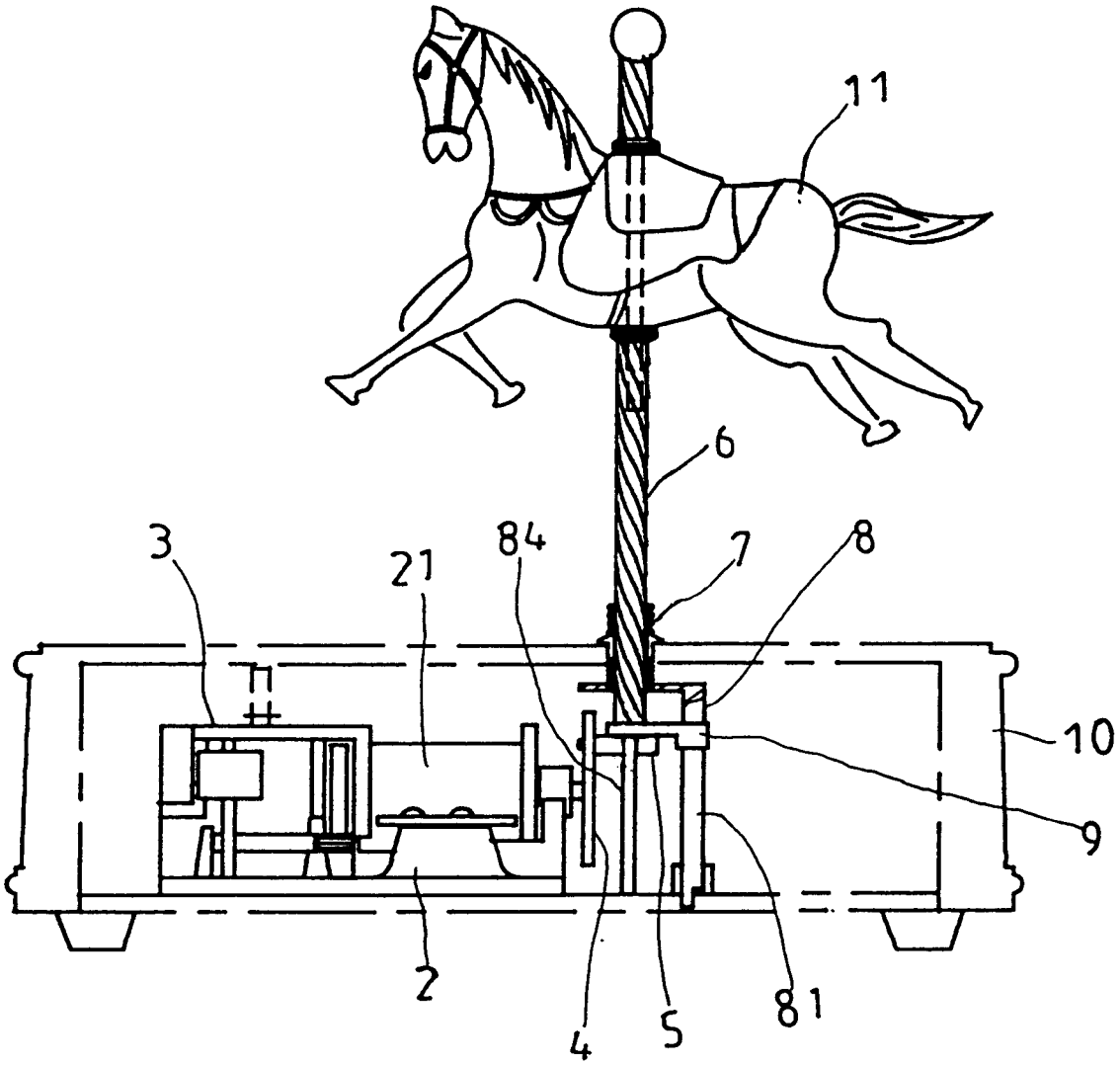
FIG. 2B is similar to FIG. 2A but showing the up stroke of the ornament.

Referring to FIGS. 1, 2A, and 2B, the ornament, referenced by 11, is driven by the driving mechanism (clockwork) 3 of the wind-up music box mechanism 2 of a music box 10. The wind-up music box mechanism 2 is a conventional device and supported on the base 1 of the music box 10. The central shaft (not shown) of the reproducer 21 of the wind-up music box mechanism 2 has one end coupled to the driving mechanism 3, and an opposite end coupled to a rotary wheel 4. The rotary wheel [Q] *4* has an eccentric rod 5 at an outer side. A locating block 8 is fixedly mounted within the music box 10, having a channeled vertical wall 81 and a flat horizontal wall 82 perpendicularly extended from the channeled vertical wall 81 at the top. The flat horizontal wall 82 has a downward guide rod 84 vertically disposed near one end, and a through hole 83 near an opposite end. A follower plate 9 is supported on the eccentric rod 5 and moved by it along the channeled vertical wall 81 of the locating block 8. The follower plate 9 has a mounting hole 91 near one end aligned with the through hole 83 on the horizontal wall 82 of the locating block 8, and a lug 92 at an opposite end. The lug 92 defines a guide hole 93, which receives the downward guide rod 84 of the locating block 8. A copper sleeve 7 is mounted within the through hole 83 of the flat horizontal wall 82. A tappet rod 6 is inserted through the copper sleeve 7, having a bottom end fixedly fastened to the mounting hole 91 of the follower plate 9, and a top end extended out the music box 10 and coupled to the ornament 11. Therefore, when the reproducer 21 is turned by the driving mechanism 3, the rotary wheel 4 is rotated to move the eccentric rod 5, causing it to reciprocate the follower plate 9 along the downward guide rod 84. When the follower plate 9 is reciprocated, the tappet rod 6 is carried to move the ornament 11 up and down alternatively.

Figure 2C:
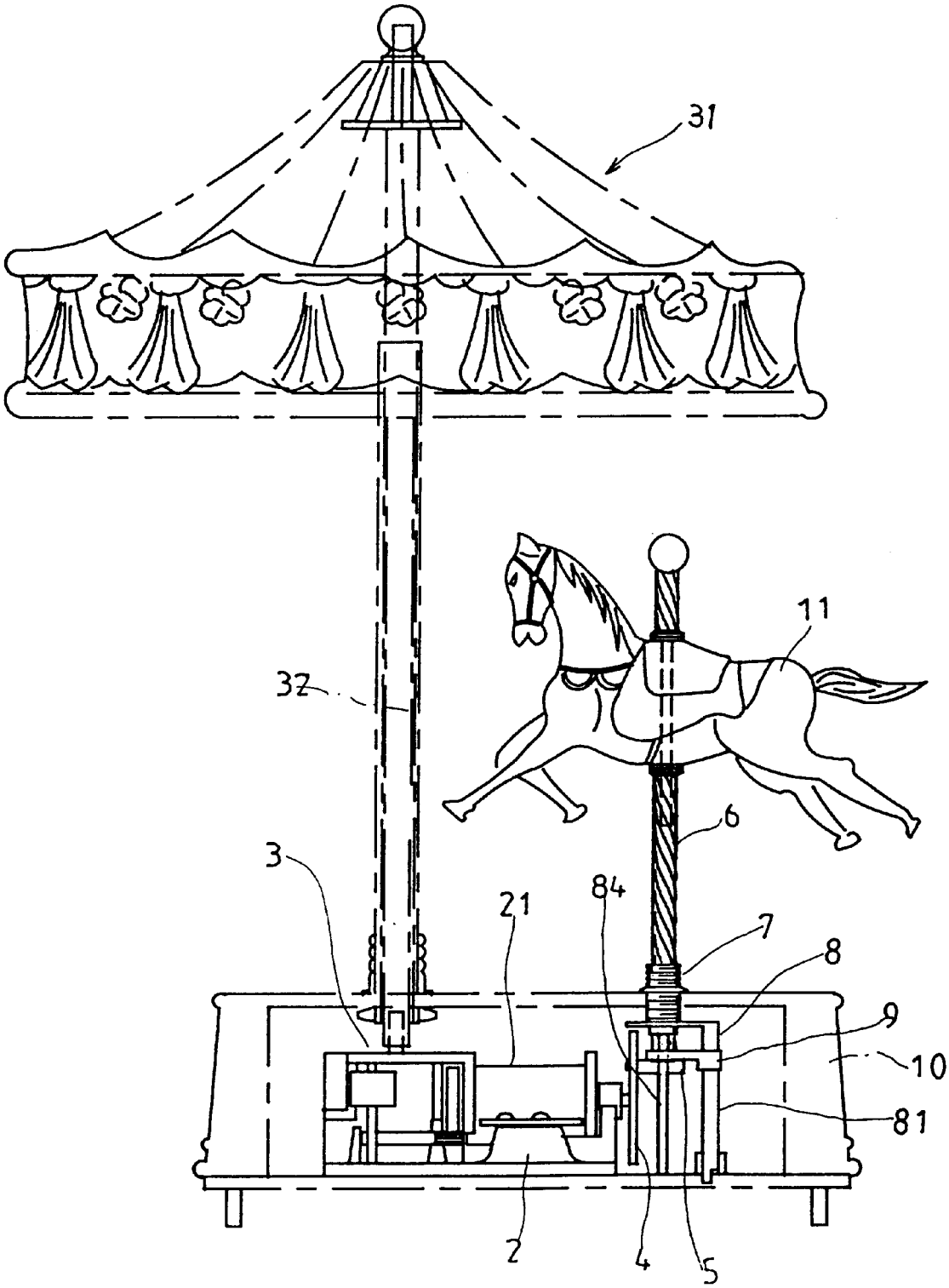
FIG. 2C shows a second ornament coupled to the revolving shaft of the driving mechanism shown in FIG. 2A.

Referring to FIG. 2C, an upright rod 32 is coupled to the revolving shaft of the driving mechanism 3 and driven by it to rotate an ornament 31.

Figure 2D:
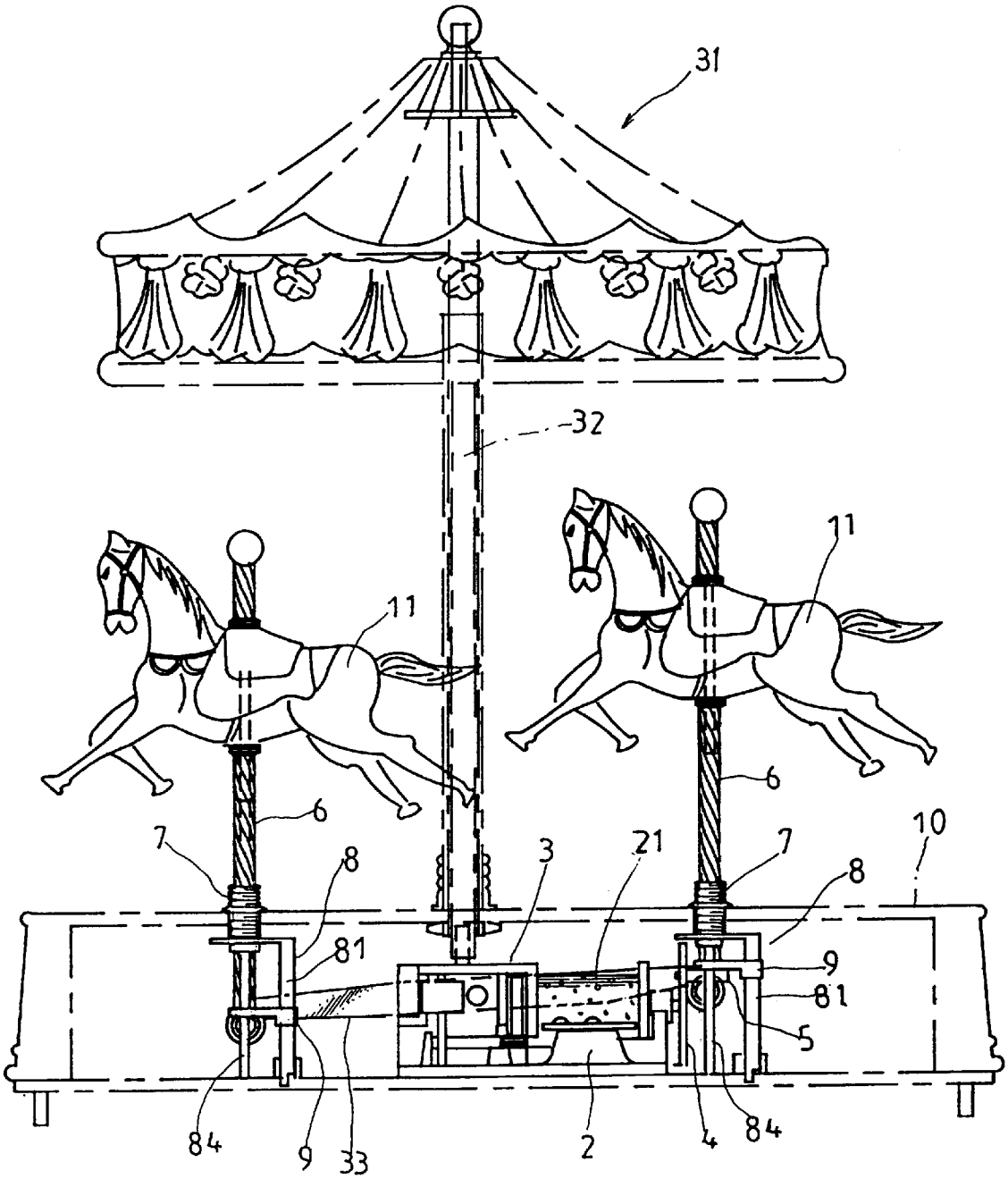
FIG. 2D shows two ornaments respectively mounted on two tappet rods and alternatively moved up and down by a seesaw according to the present invention.

FIG. 2D shows another alternate form of the present invention in which a seesaw 33 is coupled to the driving mechanism 3 and turned back and forth to impart alternating vertical movements two ornaments 11.

Figure 3:
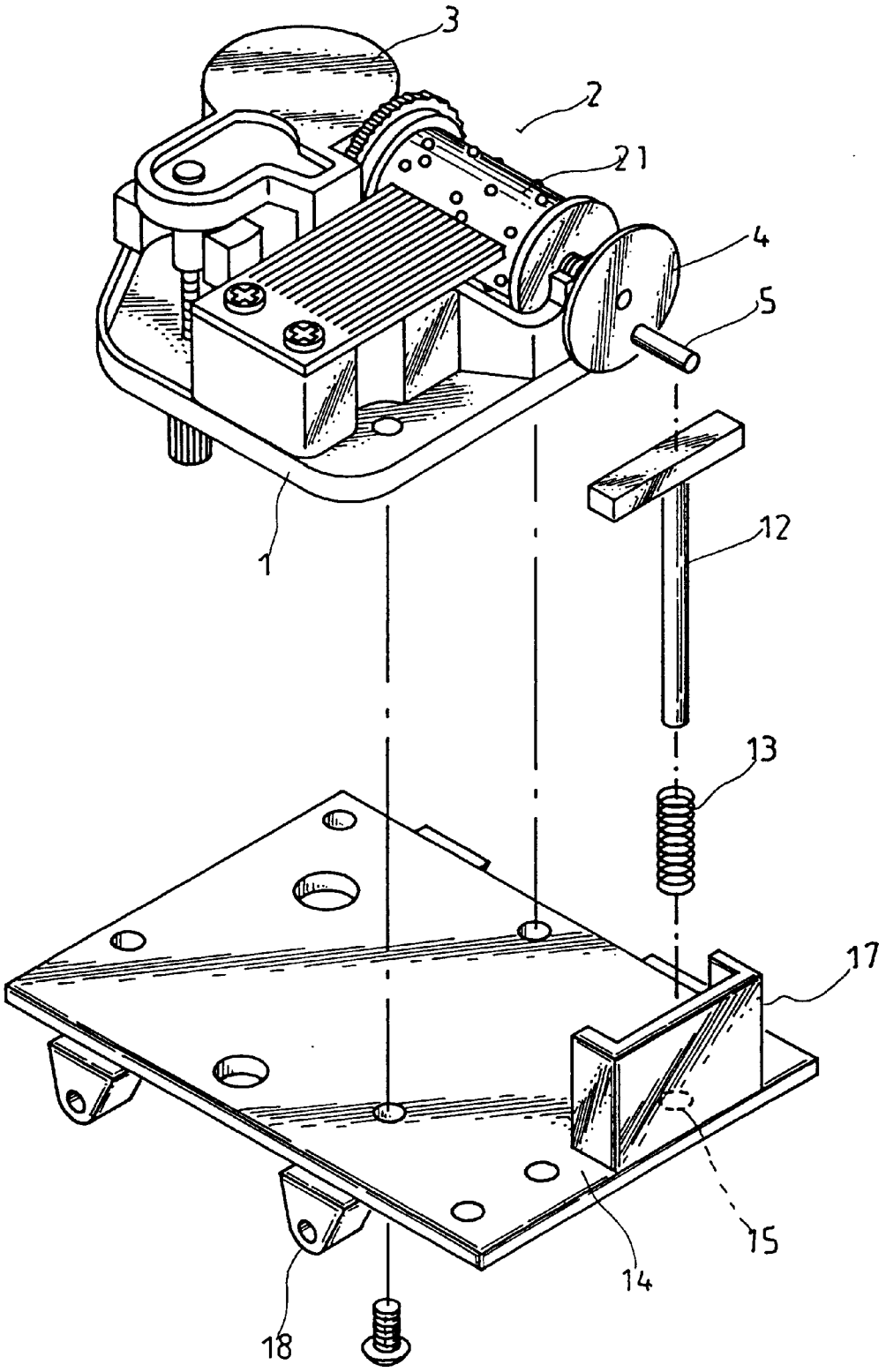
FIG. 3 is another alternate form of the transmission mechanism according to the present invention.
Figure 4:
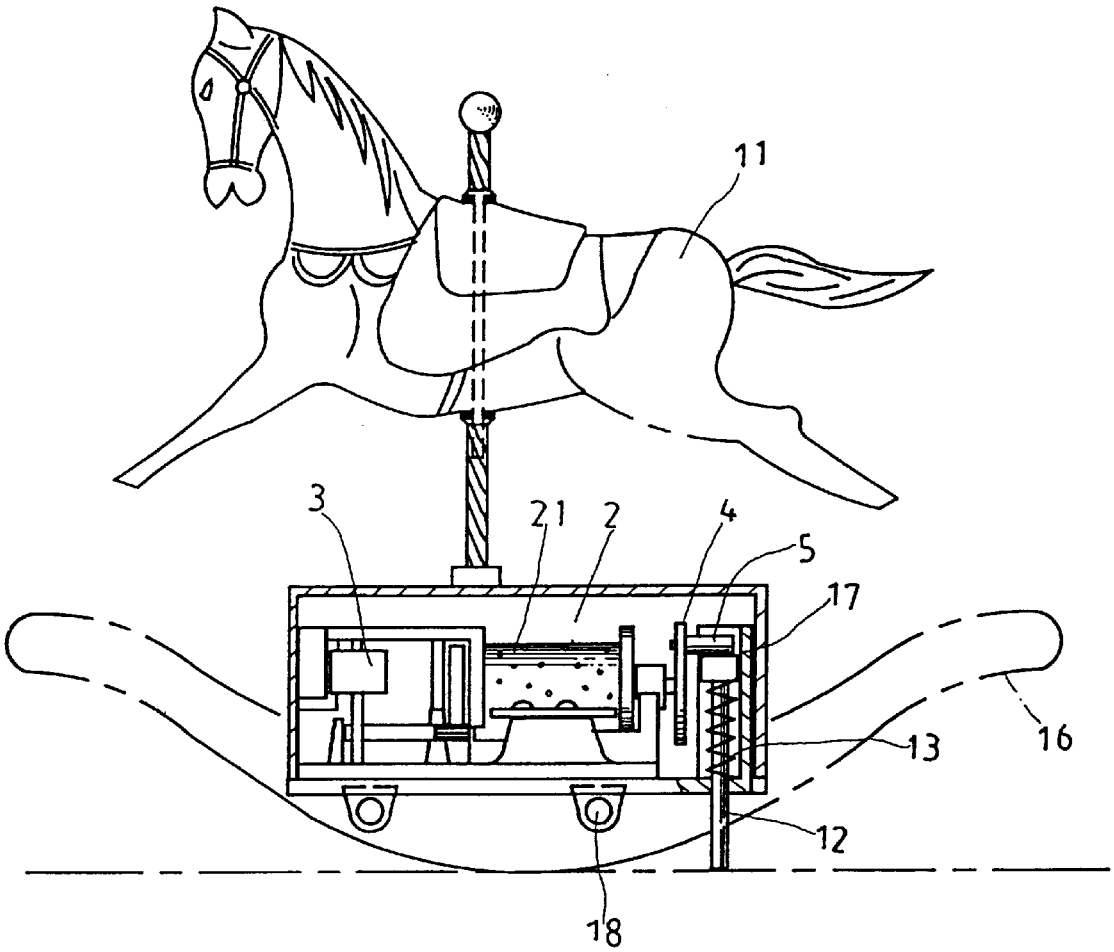
FIG. 4 shows the transmission mechanism of FIG. 3 installed in a rocker.
Figure 5:
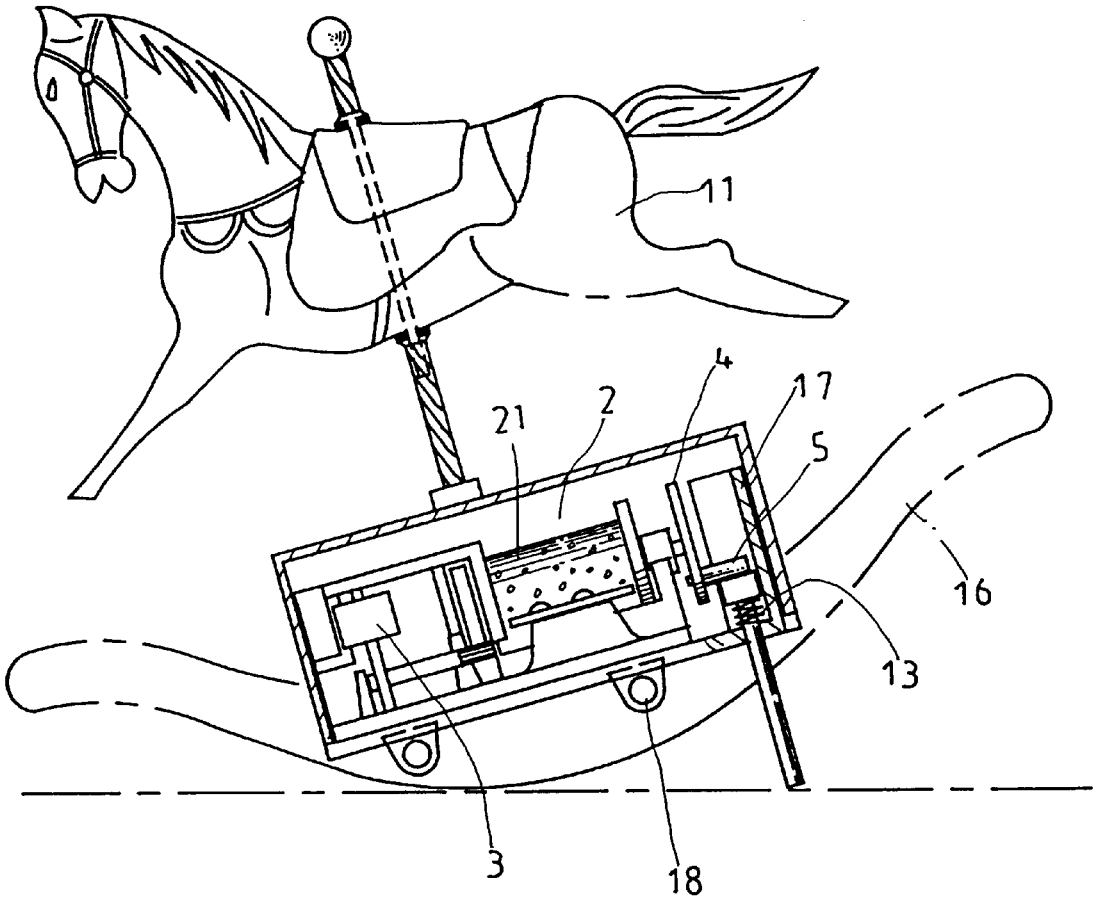
FIG. 5 is similar to FIG. 4 but showing the T-rod moved downwards and the rocker moved forwards.

FIGS. 3 and 4 show still another alternate form of the present invention. As illustrated, the base 1 of the wind-up music box mechanism 2 is mounted on a supporting plate 14. The reproducer 21 has one end coupled to the driving mechanism 3, and an opposite end coupled with a rotary wheel 4, which has an eccentric rod 5 at an outer side. The eccentric rod 5 of the rotary wheel 4 is stopped above a T-rod 12, which is inserted through a through hole 15 on the supporting plate 14 and supported above a spring 13 within an upright guide block 17. The supporting plate 14 has a plurality of lugs 18 at two opposite sides respectively fastened to two opposite sides of a rocker 16. An ornament 11 is mounted on the rocker 16 over the wind-up music box mechanism 2. The rocker 16 has a hole (not shown) for passing the T-rod 12. When the rotary wheel 4 is turned by the driving mechanism 3 through the reproducer 21, the T-rod 12 is alternatively depressed and released. When the T-rod 12 is depressed, it passes through the rocker 16 and stops against the ground, causing the rocker 16 moved forwards. When the T-rod 12 is released, it is forced upwards by the spring 13, and therefore the rocker 16 moves backwards. Therefore, the rocker 16 moves forwards and backwards alternatively when the wind-up music box mechanism 2 is operated.

I claim:

1. A transmission mechanism for music box ornament, comprising:

a rotary wheel rotated by a reproducer of a wind-up music box mechanism, said rotary wheel having an eccentric rod;

a locating block fixedly mounted within a base plate within which said wind-up music box mechanism is mounted, said locating block comprising a channeled vertical wall and a flat horizontal wall perpendicularly extended from top of said channeled vertical wall, said flat horizontal wall having a downward guide rod at one end of said flat horizontal wall and a through hole at an opposite end;

a follower plate supported on said eccentric rod and moved by it along said channeled vertical wall and said downward guide rod of said locating block, said follower plate having a mounting hole at one end aligned with said through hole of said flat horizontal wall of said locating block, and a guide hole at an opposite end, which loosely receives the downward guide rod of said locating block;

a copper sleeve fixedly mounted within said through hole of said flat horizontal wall of said locating block; and a tappet rod inserted through said copper sleeve and reciprocated by said eccentric rod through said follower plate, said tappet rod having a bottom end fixedly fastened to the mounting hole of said follower plate, and a top end coupled with an ornament.

[2. The transmission mechanism of claim 1 wherein said base plate is supported on a rocker, having an upright guide block at one end, a through hole adjacent to said upright guide block, a T-rod inserted through said through hole and stopped beneath said eccentric rod of said rotary wheel, and a spring mounted around said T-rod to impart upward force to said T-rod against said eccentric rod of said rotary wheel, said T-rod being alternatively moved up and down by said eccentric rod of said rotary wheel and said spring to force said rocker moved forwards and backwards alternatively when said wind-up music box mechanism is operated.]

*3. The transmission mechanism of claim 1 further comprising a seesaw coupled to a driving mechanism of said wind-up music box mechanism and turned back and forth to impart alternating vertical movement of two ornaments.*

*4. A transmission mechanism for music box ornament, comprising:*

*a rotary wheel rotated by a reproducer of a conventional wind-up music box mechanism and having an eccentric rod;*

*a tappet rod having a bottom end fixedly fastened on said music box and a top end coupled with an ornament;*

*a rocker;*

*a supporting plate for mounting a base of said wind-up music box mechanism thereon, which is supported on said rocker and has an upright guide block at one end, a through hole adjacent to said upright guide block, a T-rod inserted through said through hole and stopped beneath said eccentric rod of said rotary wheel, and a spring mounted around said T-rod to impart upward force to said T-rod against said eccentric rod of said rotary wheel, said T-rod being alternatively moved up and down by said eccentric rod of said rotary wheel and said spring to force said rocker moved forwards and backwards alternatively when said wind-up music box mechanism is operated.*

*5. The transmission mechanism of claim 4 wherein said support plate has a plurality of lugs at two opposite sides respectively fastened to two opposite sides of said rocker.*

*6. The transmission mechanism of claim 4 wherein said rocker has a hole for passing said T-rod therethrough.*

*7. A transmission mechanism for a music box having an ornament mounted thereon, comprising:*

*a rocker;*

*a driving device having a rotary wheel with an eccentric rod and disposed in said music box; and*

*a support connecting said music box with said rocker and having a following piece to be inserted through a hole of said rocker and stopped beneath said eccentric rod, and a resilient element for urging said following piece against said eccentric rod, wherein said following piece is alternately moved up and down by said eccentric rod and said resilient element to force said rocker moved forwards and backwards alternately when said rotary wheel is rotated.*

*8. The transmission mechanism of claim 7 wherein said ornament is connected to said music box through a tappet.*

*9. The transmission mechanism of claim 7 wherein said following piece is a T-rod.*

*10. The transmission mechanism of claim 7 wherein said resilient element is a spring.*

*11. The transmission mechanism of claim 7 wherein said support has a plurality of lugs at two opposite sides respectively fastened to two opposite sides of said rocker.*

*12. The transmission mechanism of claim 7 wherein said support has a through hole to enable one end of said following piece to pass therethrough.*

*13. The transmission mechanism of claim 12 wherein said support further includes an upright guide block adjacent to said through hole for guiding said following piece to vertically move up and down.*

* * * * *